(12) United States Patent
Nakamura et al.

(10) Patent No.: US 8,974,906 B2
(45) Date of Patent: Mar. 10, 2015

(54) WEATHER-RESISTANT ADHESIVE COMPOSITION

(75) Inventors: Yuko Nakamura, Otsu (JP); Kenichi Eguchi, Otsu (JP)

(73) Assignee: Toyobo Co., Ltd., Osaka (JP)

(*) Notice: Subject to any disclaimer, the term of this patent is extended or adjusted under 35 U.S.C. 154(b) by 0 days.

(21) Appl. No.: 13/981,676

(22) PCT Filed: Mar. 26, 2012

(86) PCT No.: PCT/JP2012/057696
§ 371 (c)(1),
(2), (4) Date: Jul. 25, 2013

(87) PCT Pub. No.: WO2012/133270
PCT Pub. Date: Oct. 4, 2012

(65) Prior Publication Data
US 2013/0309504 A1    Nov. 21, 2013

(30) Foreign Application Priority Data
Mar. 28, 2011  (JP) .................. 2011 070200

(51) Int. Cl.
*C09J 175/06* (2006.01)
*B32B 27/40* (2006.01)

(52) U.S. Cl.
USPC ............... 428/423.7; 428/424.8; 428/421; 156/331.7; 525/440.01

(58) Field of Classification Search
USPC ......... 428/424.8, 421, 423.7; 156/331.7, 332; 525/440.01
See application file for complete search history.

(56) References Cited

FOREIGN PATENT DOCUMENTS

| JP | 63132099 A | * | 6/1988 |
|----|----|----|----|
| JP | 2003-82324 | | 3/2003 |
| JP | 2004-238403 | | 8/2004 |
| JP | 2005060607 A | * | 3/2005 |
| JP | 2006-57089 | | 3/2006 |
| JP | 2007-39535 | | 2/2007 |
| JP | 2007-63449 | | 3/2007 |
| JP | 2007-320218 | | 12/2007 |
| JP | 2010-43238 | | 2/2010 |
| WO | 2008/120688 | | 10/2008 |

OTHER PUBLICATIONS

International Search Report issued Jun. 19, 2012 in International (PCT) Application No. PCT/JP2012/057696.
Extended European Search Report issued Aug. 14, 2014 in corresponding European Application No. 12763023.4.

* cited by examiner

*Primary Examiner* — Thao T. Tran
(74) *Attorney, Agent, or Firm* — Wenderoth, Lind & Ponack, L.L.P.

(57) ABSTRACT

The present invention is to provide a weather-resistant adhesive which achieves adhesive property, moist heat resistance and weather resistance in a practical level by means of aging at low temperature and for short time. There is provided a weather-resistant adhesive composition, characterized in containing (A) a polyester polyol having an acid value of 30 to 150 equivalents/$10^6$ g and (B) a polyisocyanate compound comprising an aliphatic polyisocyanate compound and/or an alicyclic polyisocyanate compound. Also, there is provided a layered product, characterized in being prepared by laminating films using said composition.

12 Claims, No Drawings

WEATHER-RESISTANT ADHESIVE COMPOSITION

TECHNICAL FIELD OF THE INVENTION

The present invention relates to a weather-resistant adhesive composition which is suitable for outdoor industry use, etc.

BACKGROUND ART

A polyurethane adhesive containing polyester polyol has been known as a weather-resistant adhesive composition for outdoor industry use such as for building materials and solar battery panel materials.

Patent Document 1 discloses a layered product comprising a polyester film, a specific polyurethane adhesive and aluminum foil and a layered product comprising a polyester film, a specific polyurethane adhesive and a polyvinylidene fluoride film. It is also disclosed therein that the layered products as such have excellent resistance to moist heat for a long period. Further, Patent Documents 2 and 3 disclose layered products where three kinds of multi-layered films are adhered with each other using a polyurethane adhesive and it is also disclosed that the layered products as such have excellent resistance to weather.

PRIOR ART DOCUMENTS

Patent Documents

Patent Document 1: Japanese Patent Application Laid-Open (JP-A) No. 2010-43238
Patent Document 2: Japanese Patent Application Laid-Open (JP-A) No. 2007-320218

DISCLOSURE OF THE INVENTION

Problem that the Invention is to Solve

In the case of, for example, coating to metal plate or adhesion of metal plates in a curing reaction of polyurethane, it is possible to apply the temperature of as high as near 200° C. so as to make the curing time short. However, there are also many cases where application of high temperature is not possible depending upon the type or the form of the materials to be adhered. A typical example thereof is the manufacture of the layered products containing a resin film as disclosed in Patent Documents 1 and 2. In the Examples of Patent Document 1, aging at 60° C. is conducted for seven days while, in the Examples of Patent Document 2, aging at 50° C. for five days is conducted for manufacting a layered product. As such, it has been common in the prior art to conduct an aging treatment for long time of about five to seven days at relatively low temperature of about 50 to 60° C. If the aging temperature can be made similar to or lower than that in the current status and the aging time can be also made short, that is preferred in view of conservation of energy, enhancement in workability/productivity and reduction in cost.

Under such circumstances, a problem that the present invention is to solve is to provide a weather-resistant adhesive which exhibits adhesive property, moist heat resistance and weather resistance in a practical level by means of aging at low temperature and for short time.

Means for Solving the Problem

In order to solve the above problem, the present inventors have carried out extensive investigations and, as a result, they have found that an adhesive composition comprising a polyester polyol having an acid value within a specific range and a polyisocyanate compound exhibits adhesive property, moist heat resistance and weather resistance in a practical level by means of aging for a short period of about one day at relatively low temperature of about 40 to 60° C. Thus, the present invention has the following constitutions (1) to (8):

(1) A weather-resistant adhesive composition, characterized in containing (A) a polyester polyol having an acid value of 30 to 150 equivalents/$10^6$ g and (B) a polyisocyanate compound comprising an aliphatic polyisocyanate compound and/or an alicyclic polyisocyanate compound.

(2) The weather-resistant adhesive composition according to (1), wherein the polyester polyol (A) contains 60 molar % or more of isophthalic acid and/or orthophthalic acid as a whole to the total acid components constituting the polyester polyol.

(3) The weather-resistant adhesive composition according to (1) or (2), wherein the polyester polyol (A) contains an aliphatic glycol having carbon number of 5 or more.

(4) The weather-resistant adhesive composition according to any of (1) to (3), wherein a glass transition temperature of the polyester polyol (A) is −20 to 20° C. and a number-average molecular weight of the polyester polyol (A) is 5,000 to 40,000.

(5) The weather-resistant adhesive composition according to any of (1) to (4), wherein the polyisocyanate compound (B) contains at least one component selected from the group consisting of an adduct type of hexamethylene diisocyanate (HDI), an isocyanurate type of HDI, a biuret type of HDI, an adduct type of isophorone diisocyanate (IPDI), an isocyanurate type of IPDI and a biuret type of IPDI.

(6) The weather-resistant adhesive composition according to any of (1) to (5), wherein the compounding ratio of the polyisocyanate compound (B) to the polyester polyol (A) is 1 to 20 part(s) by weight of the polyisocyanate compound (B) to 100 parts by weight of the polyester polyol (A).

(7) A layered product, characterized in being prepared by laminating one or more kind(s) of the film being composed of any of polyester, fluorine polymer and polyethylene using the weather-resistant adhesive composition mentioned in any of (1) to (6) as an adhesive layer.

(8) A method for manufacturing a layered product, characterized in comprising the steps of applying the weather-resistant adhesive composition mentioned in any of (1) to (6) to a film which is composed of any of polyester, fluorine polymer and polyethylene, then layering a film which is composed of any of polyester, fluorine polymer and polyethylene on the applied surface by means of dry lamination and, after that, conducting aging treatment at 40 to 70° C. until the gel fraction reaches 40% by weight or more.

Advantages of the Invention

The adhesive composition of the present invention exhibits adhesive property, moist heat resistance and weather resistance in a practical level by means of an aging for a short period of about one day at a relatively low temperature of about to 60° C. Therefore, it is now possible to achieve conservation of energy, enhancement in workability/productivity and reduction in cost.

Best Mode for Carrying Out the Invention

The adhesive composition of the present invention contains (A) a polyester polyol having an acid value of 30 to 150 equivalents/$10^6$ g and (B) a polyisocyanate compound comprising an aliphatic polyisocyanate compound and/or an alicyclic polyisocyanate compound.

The polyester polyol (A) used in the present invention is composed of chemical structure obtained by polycondensation of polycarboxylic acid with polyhydric alcohol. With regard to the polycarboxylic acid, it is preferred to use one or more dibasic acid (s) such as an aliphatic dibasic acid (e.g., succinic acid, glutaric acid, adipic acid, pimelic acid, suberic acid, azelaic acid, sebacic acid, brassylic acid, dimer acid and a hydrogenated product thereof), and an aromatic dibasic acid (e.g., terephthalic acid, isophthalic acid, orthophthalic acid and naphthalenedicarboxylic acid). With regard to the polyhydric alcohol, it is preferred to use one or more glycol(s) such as an aliphatic glycol (e.g., ethylene glycol, propylene glycol, butanediol, neopentyl glycol, methylpentanediol, pentanediol, hexanediol, heptanediol, octanediol, nonanediol, decanediol and dodecanediol), an alicyclic glycol (e.g., cyclohexanediol and hydrogenated xylylene glycol), and an aromatic ring-containing glycol (e.g., xylylene glycol). Induction of branching by copolymerization with small amount of tri- or higher functional polycarboxylic acid such as trimellitic acid anhydride or pyromellitic acid anhydride and or with small amount of tri- or higher functional polyhydric glycol such as trimethylolpropane may sometimes achieve the enhancement in the reactivity with a polyisocyanate compound and that is preferred.

With regard to the dibasic acid which is copolymerized with the polyester polyol (A) used in the present invention, it is preferred to use an aromatic dibasic acid such as terephthalic acid, isophthalic acid, orthophthalic acid or 2,6-naphthalenedicarboxylic acid in view of enhancement of resistance to moist heat. In view of enhancement of resistance to weather, it is preferred that 60 molar % or more of isophthalic acid and/or orthophthalic acid are/is copolymerized as a whole. Suppression of the copolymerizing ratio of terephthalic acid to a low extent is effective in enhancing the resistance to weather and it is preferred to be less than 40 molar %, more preferred to be less than 25 molar %, and most preferred to be less than 5 molar %.

In order to make the polyester polyol of the present invention within a predetermined Tg range or in order to enhance the resistance to moist heat due to a decrease in the concentration of ester group, it is preferred that the polyester polyol of the present invention contains a long-chain aliphatic structure in its structure. In view of resistance to moist heat, the long-chain aliphatic structure is preferred to be an aliphatic glycol having carbon number of 5 or more and more preferred to be an aliphatic glycol having carbon number of 6 to 12.

In producing the polyester polyol (A) used in the present invention, there may be used the conventionally known polymerization catalyst such as a titanium compound (e.g., tetra-n-butyl titanate, tetraisopropyl titanate and titanium oxyacetylacetonate), an antimony compound (e.g., tributoxyantimony and antimony trioxide) or a germanium compound (e.g., tetra-n-butoxy germanium and germanium oxide). With regard to those catalysts, one of them may be used solely or two or more thereof may be used jointly. In view of reactivity of the polymerization, a titanium compound is preferred.

Acid value of the polyester polyol (A) used in the present invention is 30 to 150 equivalents/$10^6$ g and preferably 80 to 100 equivalents/$10^6$ g. When the acid value is too low, effect for shortening the aging time is not achieved while, when it is too high, resistance to moist heat of the resulting adhesive layer tends to lower.

Acid value can be adjusted by introducing a carboxyl group into polyester polyol. As to a method for introducing a carboxyl group into polyester polyol, there are, for example, a method where, after polymerization of polyester polyol, an acid anhydride is subjected to an after-addition thereto under ordinary pressure and in a nitrogen atmosphere so as to impart acid value and a method where such an acid anhydride is poured into an oligomer state before making the molecular weight of a polyester high and then polycondensation in vacuo is conducted to make the molecular weight high so as to introduce acid value. In the former method where trimellitic acid anhydride is used, the aimed acid value is particularly apt to be achieved. With regard to an acid anhydride which can be used for those reactions in addition to the already-mentioned trimellitic acid anhydride, preferred ones are an aromatic carboxylic acid anhydride and an alicyclic carboxylic acid anhydride such as phthalic acid anhydride, pyromellitic acid anhydride, succinic acid anhydride, 1,8-naphthalic acid anhydride, 1,2-cyclohexanedicarboxylic acid anhydride, cyclohexane-1,2,3,4-tetracarboxylic acid 3,4-anhydride, ethyleneglycol bisanhydrotrimellitate, 5-(2, 5-dioxotetrahydro-3-furanyl) -3-methyl-3-cyclohexene-1,2-dicarboxylic acid anhydride or naphthalene-1,8:4,5-tetracarboxylic acid dianhydride . One of or two or more of them may be selected and used.

The range of glass transition temperature of the polyester polyol (A) used in the present invention is −20 to 20° C. and preferably −10 to 10° C. For preparing such a polyester polyol, a dibasic acid or glycol having a long aliphatic chain may be introduced into its composition and, for further imparting of the moist heat resistance thereto, it is preferred that an aliphatic glycol having carbon number of 5 or more is copolymerized. When the glass transition temperature is too high, adhesive force to a base material tends to become low while, when the glass transition temperature is too low, the adhesive layer is too soft whereby there is a risk that adhesive force and resistance to moist heat become low.

Although the number-average molecular weight of the polyester polyol (A) used in the present invention is not particularly limited, it is preferred to be 5,000 to 40,000 and preferred to be 9,000 to 30,000. When the number-average molecular weight of the polyester resin is too low, intercrosslink molecular weight is small whereby the coat becomes too hard and there is a risk that adhesive strength becomes low. When it is 40,000 or more, no sufficient reaction with a curing agent proceeds whereby there is a risk that the resistance to moist heat becomes low.

The polyisocyanate compound (B) used in the present invention comprises an aliphatic polyisocyanate compound and/or an alicyclic polyisocyanate compound. With regard to the aliphatic polyisocyanate compound and the alicyclic polyisocyanate compound, there may be listed hexamethylene diisocyanate and isophorone diisocyanate, respectively, as suitable examples. They are preferred in view of enhancing the weather resistance. Further, the polyisocyanate compound may also be an isocyanurate type, a biuret type or an adduct type and, among them, an isocyanurate type is particularly preferred.

The compounding ratio of the polyisocyanate compound (B) to the polyester polyol (A) used in the present invention is preferred to be 1 to 20 part (s) by weight, and more preferred to be 5 to 10 part (s) by weight, of the polyisocyanate compound (B) to 100 parts by weight of the polyester polyol (A). When the compounding ratio of the polyisocyanate compound (B) is too low, the cross-linking density is too low whereby there is a risk of affecting the adhesive property and/or the moist heat resistance while, when the compounding ratio is too high, the cross-linking density of the adhesive layer is too high whereby there is a possibility that adhesive property is inferior.

The adhesive composition used in the present invention may be compounded with a sequestering agent for terminals such as a carbodiimide compound, an oxazoline compound or an epoxy compound in any ratio in order to sequester the carboxyl group which is produced when a polyester component constituting the adhesive composition is hydrolyzed.

Examples of the above-mentioned carbodiimide compound include N,N'-di-o-toluyl carbodiimide, N,N'-diphenyl carbodiimide, N,N'-di-2,6-dimethylphenyl carbodiimide, N,N'-bis(2,6-diisopropylphenyl) carbodiimide, N,N'-dioctyldecyl carbodiimide, N-toluyl-N'-cyclohexyl carbodiimide, N,N'-di-2,2-di-tert-butylphenyl carbodiimide, N-toluyl-N'-phenyl carbodiimide, N,N'-di-p-nitrophenyl carbodiimide, N,N'-di-p-aminophenyl carbodiimide, N,N'-di-p-hydroxyphenyl carbodiimide, N,N'-dicyclohexyl carbodiimide and N,N'-di-p-toluyl carbodiimide.

Examples of the above-mentioned oxazoline compound include a monoxazoline compound such as 2-oxazoline, 2-methyl-2-oxazoline, 2-phenyl-2-oxazoline, 2,5-dimethyl-2-oxazoline or 2,4-diphenyl-2-oxazoline; and a dioxazoline compound such as 2,2'-(1,3-phenylene)-bis(2-oxazoline), 2,2'-(1,2-ethylene)-bis(2-oxazoline), 2,2'-(1,4-butylene)-bis(2-oxazoline) or 2,2'-(1,4-phenylene)-bis(2-oxazoline).

Examples of the above-mentioned epoxy compound include diglycidyl ether of an aliphatic diol such as 1,6-hexanediol, neopentyl glycol or polyalkylene glycol; polyglycidyl ether of an aliphatic polyol such as sorbitol, sorbitan, polyglycerol, pentaerythritol, diglycerol, glycerol or trimethylolpropane; polyglycidyl ether of an alicyclic polyol such as cyclohexane-dimethanol; diglycidyl ester or polyglycidyl ester of an aliphatic or aromatic polycarboxylic acid such as terephthalic acid, isophthalic acid, naphthalenedicarboxylic acid, trimellitic acid, adipic acid or sebacic acid; diglycidyl ether or polyglycidyl ether of polyhydric phenol such as resorcinol, bis(p-hydroxyphenyl)methane, 2,2-bis(p-hydroxyphenyl)-propane, tris(p-hydroxyphenyl)methane or 1,1,2,2-tetrakis-(p-hydroxyphenyl)ethane; N-glycidyl derivative of an amine such as N,N-diglycidylaniline, N,N-diglycidyl-toluidine or N,N,N',N'-tetraglycidyl-bis(p-aminophenyl)methane; triglycidyl derivative of aminophenyl; triglycidyl-tris-(2-hydroxyethyl) isocyanurate; triglycidyl isocyanurate; epoxy of o-cresol type; and epoxy of phenol novolak type.

A known additive such as ultraviolet absorber or antioxidant may be made to contain in the adhesive composition of the present invention and, as a result thereof, weather resistance and moist heat resistance may be further enhanced.

One or more kind(s) of film composed of any of polyester, fluorine polymer and polyethylene is/are laminated using the adhesive composition of the present invention as an adhesive layer whereupon a layered product can be prepared. The above-mentioned layered product may be not only a three-layered product of film/adhesive layer/film but also a five-layered product of film/adhesive layer/film/adhesive layer/film or a layered product having more layers than that. Each of the films constituting the above layered product may be composed of a material in the same type or of materials in different types.

Examples of the polyester constituting a film composed of the above-mentioned polyester include polyethylene terephthalate (PET), polyethylene naphthalate (PEN), polybutylene terephthalate (PBT) and polycyclohexanedimethanol terephthalate (PCT).

Examples of the fluorine polymer constituting a film composed of the above-mentioned fluorine polymer include fluorinated polyolefin and a copolymer of polyolefin with fluorinated polyolefin and specific examples thereof include poly(vinyl fluoride) (PVF), poly(vinylidene fluoride) (PVDF), polychlorotrifluoroethylene (PCTFE), polyethylenetetrafluoro-ethylene (ETFE), polytetrafluoroethylene (PTFE), a copolymer of tetrafluoroethylene with perfluoroalkyl vinyl ether (PFA) and a copolymer of tetrafluoroethylene with hexafluoropropylene (FEP).

Examples of polyethylene constituting a film composed of the above-mentioned polyethylene include polyethylene, super-high molecular weight polyethylene and any of the above to which various kinds of additives are added.

It is preferred that a base material used in the present invention is subjected to a surface treatment such as corona treatment, flame treatment or plasma treatment for a purpose of enhancing the adhesive property of applied surface and adhesive surface.

Thickness (after drying) of an adhesive layer comprising the adhesive composition of the present invention is usually 5 to 30 microns although such a range is not limitative.

EXAMPLES

As hereunder, the present invention will be illustrated by referring to Examples. In the Examples, the term which merely reads "part(s)"' stands for "part(s) by weight". Each of the measuring items was in accordance with the following method.

(Composition of a Polyester)

Determination of composition and composition ratio of a polyester resin was carried out by means of $^1$H-NMR measurement (resonance frequency: 400 MHz) (a proton-type nuclear magnetic resonance spectral measurement). An NMR device 400-MR manufactured by Varian was used as a measuring device and heavy chloroform was used as a solvent.

(Number-Average Molecular Weight Mn)

A sample (4 mg) was dissolved in 4 ml of tetrahydrofuran (to which 5 mM of tetrabutylammonium chloride was added) and filtered using a membrane filter of 0.2 pm and the resulting sample solution was subjected to a gel permeation chromatographic analysis. The device used was Tosoh HLC-8220 and the measurement was conducted at 40° C. using a differential refractive index detector. Number-average molecular weight was calculated in terms of a value substituted as standard polystyrene where the area corresponding to less than 1000 molecular weight was eliminated.

(Glass Transition Temperature Tg)

Glass transition temperature was measured using differential scanning calorimeter (DSC-200 manufactured by SII). A sample (5 mg) was placed in a container with a pressing-down cover made of aluminum, tightly sealed, cooled down to −50° C. using liquid nitrogen and heated up to 150° C. at the rate of 20° C. per minute. In an endothermic curve obtained during the above process, temperature at the point of intersection of the base line before endothermic peak was resulted with a tangent going to endothermic peak was adopted as a glass transition temperature (Tg; unit: ° C.).

(Acid Value AV)

A sample (0.2 g) was precisely weighed, dissolved in 40 ml of chloroform and subjected to titration using 0.01N ethanolic solution of potassium hydroxide. Phenolphthalein was used as an indicator. The measured value was calculated based on an equivalent per $10^6$ g of the sample and equivalent/$10^6$ g was adopted as the unit.

Manufacturing Example of Polyester Polyol (1)

Into a reactor equipped with stirrer, condenser and thermometer were charged 464 parts of isophthalic acid, 179 parts of orthophthalic acid, 4 parts of trimellitic acid anhydride, 100 parts of neopentyl glycol, 598 parts of 1,6-hexanediol and 0.03 molar % (to the total acid components) of tetra-n-butyl titanate (hereinafter, it may be sometimes abbreviated as TBT) as a catalyst and then a transesterification reaction was carried out where the temperature was raised from 160° C. to 230° C. during 4 hours. After that, the inside of the system was gradually evacuated down to 5 mmHg during 20 minutes and polycondensation reaction was carried out at 260° C. in vacuo (not higher than 0.3 mmHg) for 90 minutes. The above was then cooled down to 220° C. in a nitrogen stream, 4 parts of trimellitic acid anhydride was poured thereinto and the reaction was carried out for 30 minutes. The resulting polyester polyol (1) was subjected to a composition analysis by means of NMR whereupon the acid components were composed of isophthalic acid, orthophthalic acid and trimellitic acid in a molar ratio of 69.6/30/0.5 while the glycol components were composed of neopentyl glycol and 1, 6-hexanediol in a molar ratio of 10/90. Number-average molecular weight was 18,000, glass transition temperature was 0° C. and acid value was 40 equivalents/$10^6$ g.

Manufacturing Example of Polyester Polyol (15)

Into a reactor equipped with stirrer, condenser and thermometer were charged 464 parts of isophthalic acid, 179 parts of orthophthalic acid, 4 parts of trimellitic acid anhydride, 100 parts of neopentyl glycol, 598 parts of 1,6-hexanediol and 0.03 molar % (to the total acid components) of TBT as a catalyst and then a transesterification reaction was carried out where the temperature was raised from 160° C. to 230° C. during 4 hours. After that, the inside of the system was gradually evacuated down to 5 mmHg during 20 minutes and polycondensation reaction was carried out at 260° C. in vacuo (not higher than 0.3 mmHg) for 90 minutes. The resulting polyester polyol (15) was subjected to a composition analysis by means of NMR whereupon the acid components were composed of isophthalic acid, orthophthalic acid and trimellitic acid in a molar ratio of 69.6/30/0.5 while the glycol components were composed of neopentyl glycol and 1, 6-hexanediol in a molar ratio of 10/90. Number-average molecular weight was 18,000, glass transition temperature was 0° C. and acid value was 10 equivalents/$10^6$ g.

Manufacturing Example of Polyester Resins (2) to (14) and (16)

Polyester resins (2) to (14) and (16) were manufactured in accordance with the manufacturing example of the polyester resin (1) except that the types and the compounding ratio of the materials were modified. The result is shown in Table 1.

TABLE 1

| | | polyester polyol | | | | | | | |
|---|---|---|---|---|---|---|---|---|---|
| | | 1 | 2 | 3 | 4 | 5 | 6 | 7 | 8 |
| resin compo- sition (molar ratio) | TPA | | | | | | | | 30 |
| | IPA | 69.5 | 69.5 | 69.5 | 69.5 | 69.5 | 70 | 69.5 | 49 |
| | OPA | 30 | 30 | 30 | 30 | 30 | 30 | | 25 |
| | SA | | | | | | | | 25 |
| | TMA | 0.5 | 0.5 | 0.5 | 0.5 | 0.5 | | 0.5 | 1 |
| | EG | | | | | | | | |
| | NPG | 10 | 10 | 10 | 10 | 10 | 10 | 10 | 100 |
| | HD | 90 | 90 | 90 | 90 | 90 | 90 | 90 | |
| | TMA | 0.5 | 2 | 0.8 | 1.2 | 1 | 1 | 1 | 1 |
| | TMEG | | | | | | | | |
| physical property value | AV | 40 | 140 | 70 | 90 | 80 | 80 | 80 | 80 |
| | Tg | 0 | 0 | 0 | 0 | 0 | 0 | 7 | 10 |
| | Mn | 18000 | 18000 | 18000 | 18000 | 18000 | 18000 | 18000 | 10000 |

TABLE 2

| | | polyester polyol | | | | | | | |
|---|---|---|---|---|---|---|---|---|---|
| | | 9 | 10 | 11 | 12 | 13 | 14 | 15 | 16 |
| resin compo- sition (molar ratio) | TPA | | | | | | | | |
| | IPA | 49 | 69.5 | 61.5 | 69.5 | 69.5 | 69.5 | 69.5 | 69.5 |
| | OPA | 20 | 30 | 23 | 30 | 30 | 30 | 30 | 30 |
| | SA | 30 | | 15 | | | | | |
| | TMA | 1 | 0.5 | 0.5 | 0.5 | 0.5 | 0.5 | 0.5 | 0.5 |
| | EG | 20 | | | | | | | |
| | NPG | 80 | 10 | | 60 | 10 | 10 | 10 | 10 |
| | HD | | 90 | 100 | 40 | 90 | 90 | 90 | 90 |
| | TMA | 1 | | 1 | 1 | 1 | 1 | — | 2.5 |
| | TMEG | | 1 | | | | | | |
| physical property value | AV | 80 | 80 | 80 | 80 | 80 | 80 | 10 | 160 |
| | Tg | 10 | 0 | −22 | 25 | 0 | 0 | 0 | 0 |
| | Mn | 18000 | 18000 | 18000 | 18000 | 4000 | 45000 | 18000 | 18000 |

TPA: Residual group of terephthalic acid
IPA: Residual group of isophthalic acid
OPA: Residual group of orthophthalic acid
SA: Residual group of sebacic acid
TMA: Residual group of trimellitic acid
EG: Residual group of ethylene glycol
NPG: Residual group of neopentyl glycol
HD: Residual group of 1,6-hexanediol
TMEG: Residual group of ethylene glycol bisanhydrotrimellitate Main ingredients, curing agents and additives are those as shown below.

Main ingredients (1) to (16): Resin solutions having solid content of 30% by weight, which have been prepared by dissolving the polyester polyols (1) to (16) in ethyl acetate Curing agent 1: A solution having solid content of 50% by weight, which has been prepared by dissolving an isocyanurate type of polyisocyanate compound HDI (Desmodur N3300 manufactured by Bayer-Sumitomo Chemical) in ethyl acetate Curing agent 2: A solution having solid content of 50% by weight, which has been prepared by dissolving a biuret type of polyisocyanate compound HDI (Desmodur N3200 manufactured by Bayer-Sumitomo Chemical) in ethyl acetate Curing agent 3: A solution having solid content of 50% by weight, which has been prepared by dissolving an adduct type of polyisocyanate compound HDI (Sumidur HT manufactured by Bayer-Sumitomo Chemical) in ethyl acetate Curing agent 4: A solution having solid content of 50% by weight, which has been prepared by dissolving an isocyanurate type of polyisocyanate compound IPDI (Desmodur 24470 manufactured by Bayer-Sumitomo Chemical) in ethyl acetate Curing agent 5: A solution having solid content of 50% by weight, which has been prepared by dissolving an isocyanurate type of polyisocyanate compound TDI (Desmodur IL 1351 manufactured by Bayer-Sumitomo Chemical) in ethyl acetate Additive 1: A solution, which has been prepared by dissolving an antioxidant (Irganox 1010 manufactured by BASF) in ethyl acetate to make the solid content 10% by weight Additive 2: A solution, which has been prepared by dissolving an ultraviolet absorber (Tinuvin 234 manufactured by BASF) in ethyl acetate to make the solid content 10% by weight Example 1

(Manufacture of an Adhesive (1))

The main ingredient (1) (10 parts), 0.6 part of the curing agent 1, 0.15 part of the additive 1 and 0.3 part of the additive 2 were compounded and mixed to give an adhesive (1).

(Evaluation of Initial Adhesive Force and Moist Heat Resistance)

The adhesive (1) was applied to a base material A using an applicator so as to make the dry film thickness 10 pm and then a solvent was evaporated therefrom. After that, a base material B was adhered thereto with pressure using a dry laminator. The dry lamination was conducted with the roll temperature of 120° C., the roll load of 3 kg/cm and the speed of the thing to be adhered of 1 m/minute. Then aging of 40° C. was conducted for one day to cure the adhesive whereupon a layered product comprising (base material A)/(adhesive layer)/(base material B) was obtained. Incidentally, in Example 1, polyester film (Shinebeam Q1210 of 125 μm thickness manufactured by Toyobo) was used for both base materials A and B.

The layered product of (base material A)/(adhesive layer)/(base material B) after the curing was cut into stripes of 15 mm width and peel strength between the base materials A and B was measured (T-type peel release; tensile rate: 50 mm/minute) using a Tensilon (UTM-IV manufactured by Toyo Sokki) and was adopted as the initial adhesive force. Result of the evaluation is shown in Table 4.

Criteria for the Evaluation:
oo: 800 g/15 mm or more
o: 600 g/15 mm to less than 800 g/15 mm
Δ: 400 g/15 mm to less than 600 g/15 mm
x: less than 400 g/15 mm In addition, the layered product of (base material A)/(adhesive layer)/(base material B) after the curing was subjected to an environmental load of 105° C. and 100% RH for 192 hours using a retort tester (ES-315 manufactured by Tommy Kogyo) and cut into stripes of 15 mm width and peel strength between the base materials A and B was measured (T-type peel release; tensile rate: 50 mm/minute). Retention rate of the peel strength was calculated by the following formula and adopted as an index for moist heat resistance. The retention rate shows that the more the resulting value, the better the moist heat resistance.

Retention Rate (%)={[(Peel strength after moist heat resistance test)/(Peel strength before moist heat resistance test)]}×100

Criteria for the Evaluation:
oo: 80% or more
o: 60% to less than 80%
Δ: 40% to less than 60%
x: less than 40%

(Evaluation of Curing Degree)

The adhesive (1) was applied to polyester film (E5101 of 50 μm thickness manufactured by Toyobo; corona treatment surface) using an applicator so as to make the dry film thickness 10 μm and then a solvent was evaporated therefrom. After that, polypropylene film (P2161 of 50 μm thickness manufactured by Toyobo; non-corona treatment surface) was adhered thereto with pressure using a dry laminator. The dry lamination was conducted with the roll temperature of 120° C., the roll load of 3 kg/cm and the speed of the thing to be adhered of 1 m/minute. Then aging of 40° C. was conducted for 24 hours to cure the adhesive, and polypropylene film was removed whereupon a layered product of (polyester film)/(adhesive) was obtained.

The layered product of (polyester film)/(adhesive) after the aging was cut into stripes of 2.5 cm length and 10 cm width, subjected to weight measurement (the resulting weight: A) and dipped for one hour into a mixed solution of ethyl acetate and methyl ethyl ketone in a weight ratio of 1/1. The layered product was taken out, dried with a hot-air drier for one hour and subjected to weight measurement (the resulting weight: B). After that, the adhesive layer remained in the layered product was scraped off and the weight of the polyester film only was measured (the resulting weight: C). The value calculated by the following formula was adopted as a curing degree (%). Result of the evaluation is shown in Table 4.

Curing Degree (%)={(B−C)/(A−C)}×100

Criteria for the Evaluation:
oo: 80% or more
o: 40% to less than 80%
x: less than 40%

(Evaluation of Weather Resistance)

The adhesive (1) was applied to polyester film (Shinebeam Q1210 of 50 μm thickness manufactured by Toyobo) using an applicator so as to make the dry film thickness 20 g and then a solvent was evaporated therefrom. After that, polypropylene film (P2161 of 50 μm thickness manufactured by Toyobo; non-corona treatment surface) was adhered thereto with pressure using a dry laminator. The dry lamination was conducted with the roll temperature of 120° C., the roll load of 3 kg/cm and the speed of the thing to be adhered of 1 m/minute. Then aging of 40° C. was conducted for 24 hours to cure the adhesive, and polypropylene film was removed whereupon a layered product of (polyester film)/(adhesive) was obtained.

Ultraviolet ray was irradiated from the side of the adhesive of the layered product comprising (polyester film)/(adhesive) after the aging. Irradiation of ultraviolet ray was conducted using a UV irradiation tester (Eye Super UV Tester, SUV-W151 manufactured by Iwasaki Denki) where irradiation condition was 60° C. (temperature of black panel), relative humidity was 60%, only irradiation was done, irradiating strength was 100 mW/cm² and irradiating time was 24 hours. The Co-b values of the layered product of (polyester film)/(adhesive) before and after the irradiation were measured using a color-difference meter (ZE 2000 manufactured by Nippon Denshoku) and the difference of the values before and after the irradiation was used as an index for weather resistance. It is shown that, when the value is higher, degree of yellowing is higher whereby the weather resistance is inferior. Result of the evaluation is shown in Table 4.

Criteria for the evaluation:
oo: less than +10
o: +10 to less than +15
x: +15 or more Examples 2 to 19 and Comparative Examples 1 to 3

Adhesives (2) to (20) were manufactured in accordance with the adhesive (1) of Example 1 except that the main ingredient and the curing agent were modified to the compounding as shown in Table 2. After that, the adhesive and the base material were modified as mentioned in Table 3 and the same evaluation as in Example 1 was carried out. Result of the evaluation is shown in Table 4.

TABLE 3

|  | polyester polyol | type of curing agent |  |  |  |  |
|---|---|---|---|---|---|---|
|  |  | 1 | 2 | 3 | 4 | 5 |
| adhesive 1 | 1 | o |  |  |  |  |
| adhesive 2 | 2 | o |  |  |  |  |
| adhesive 3 | 3 | o |  |  |  |  |
| adhesive 4 | 4 | o |  |  |  |  |
| adhesive 5 | 5 | o |  |  |  |  |

TABLE 3-continued

| | polyester polyol | type of curing agent | | | | |
|---|---|---|---|---|---|---|
| | | 1 | 2 | 3 | 4 | 5 |
| adhesive 6 | 5 | | ○ | | | |
| adhesive 7 | 5 | | | ○ | | |
| adhesive 8 | 5 | | | | ○ | |
| adhesive 9 | 6 | ○ | | | | |
| adhesive 10 | 7 | ○ | | | | |
| adhesive 11 | 8 | ○ | | | | |
| adhesive 12 | 9 | ○ | | | | |
| adhesive 13 | 10 | ○ | | | | |
| adhesive 14 | 11 | ○ | | | | |
| adhesive 15 | 12 | ○ | | | | |
| adhesive 16 | 13 | ○ | | | | |
| adhesive 17 | 14 | ○ | | | | |
| adhesive 18 | 15 | ○ | | | | |
| adhesive 19 | 16 | ○ | | | | |
| adhesive 20 | 5 | | | | | ○ |

TABLE 4

| | constitution of layered product | | | evaluation result of layered product | | | |
|---|---|---|---|---|---|---|---|
| | base material A | adhesive | base material B | initial adhesive force | moist heat resistance | curing degree | weather resistance |
| Example 1 | PET | 1 | PET | ○ | Δ | ○ | ○○ |
| Example 2 | PET | 2 | PET | ○ | Δ | ○○ | ○○ |
| Example 3 | PET | 3 | PET | ○○ | ○ | ○○ | ○○ |
| Example 4 | PET | 4 | PET | ○○ | ○ | ○○ | ○○ |
| Example 5 | PET | 5 | PET | ○○ | ○ | ○○ | ○○ |
| Example 6 | PET | 6 | PET | ○ | Δ | ○○ | ○○ |
| Example 7 | PET | 7 | PET | ○ | Δ | ○○ | ○○ |
| Example 8 | PET | 8 | PET | ○ | ○○ | ○ | ○○ |
| Example 9 | PET | 9 | PET | ○ | ○ | ○○ | ○○ |
| Example 10 | PET | 10 | PET | ○ | ○ | ○○ | ○ |
| Example 11 | PET | 11 | PET | ○ | Δ | ○○ | ○○ |
| Example 12 | PET | 12 | PET | ○ | Δ | ○○ | ○○ |
| Example 13 | PET | 13 | PET | ○○ | ○ | ○○ | ○○ |
| Example 14 | PET | 14 | PET | ○ | Δ | ○○ | ○○ |
| Example 15 | PET | 15 | PET | Δ | ○ | ○ | ○○ |
| Example 16 | PET | 16 | PET | ○ | Δ | ○○ | ○○ |
| Example 17 | PET | 17 | PET | ○ | ○ | ○ | ○○ |
| Example 18 | PVF | 5 | PVF | ○○ | ○○ | ○○ | ○○ |
| Example 19 | PE | 5 | PE | ○○ | ○ | ○○ | ○○ |
| Comparative Example 1 | PET | 18 | PET | Δ | x | x | ○○ |
| Comparative Example 2 | PET | 19 | PET | Δ | x | ○○ | ○○ |
| Comparative Example 3 | PET | 20 | PET | ○ | ○ | ○○ | x |

PET: polyester film (Shinebeam Q1210 of 125 μm thickness manufactured by Toyobo)
PVF: polyvinyl fluoride film (Tedlar of 25 μm thickness manufactured by DuPont)
PE: polyethylene film (50 μm thickness)

INDUSTRIAL APPLICABILITY

In the prior art, it has been common to carry out the aging treatment at relatively low temperature of about 50 to 60° C. for as long as about 5 to 7 days. If the aging temperature can be made similar to or lower than that in the current status and the aging time can be also made short, that is preferred in view of conservation of energy, enhancement in workability/productivity and reduction in cost.

The invention claimed is:

1. A weather-resistant adhesive composition, containing (A) a polyester polyol having an acid value of 30 to 150 equivalents/$10^6$ g and (B) a polyisocyanate compound comprising an aliphatic polyisocyanate compound and/or an alicyclic polyisocyanate compounds, wherein the polyester polyol (A) contains 60 molar % or more of isophthalic acid and/or orthophthalic acid as a whole to the total acid components constituting the polyester polyol, and wherein a glass transition temperature of the polyester polyol (A) is −20 to 20° C. and a number-average molecular weight of the polyester polyol (A) is 5,000 to 40,000.

2. The weather-resistant adhesive composition according to claim 1, wherein the polyester polyol (A) contains an aliphatic glycol having carbon number of 5 or more.

3. The weather-resistant adhesive composition according to claim 1, wherein the polyisocyanate compound (B) contains at least one component selected from the group consisting of an adduct of hexamethylene diisocyanate (HDI), an isocyanurate of HDI, a biuret of HDI, an adduct of isophorone diisocyanate (IPDI), an isocyanurate of IPDI and a biuret of IPDI.

4. The weather-resistant adhesive composition according to claim 1, wherein the compounding ratio of the polyisocyanate compound (B) to the polyester polyol (A) is 1 to 20 part(s) by weight of the polyisocyanate compound (B) to 100 parts by weight of the polyester polyol (A).

5. A layered product, characterized in being prepared by laminating two or more layers of a film being composed of a polymer selected from polyester, fluorine polymer and polyethylene using the weather-resistant adhesive composition according to claim 1 as an adhesive layer, wherein the two or more layers of film may be composed of the same of different polymers.

6. A method for manufacturing a layered product, characterized in comprising the steps of applying the weather-resistant adhesive composition according to claim 1 to a film which is composed of a polymer selected from polyester, fluorine polymer and polyethylene, then layering a film which is composed of a polymer selected from polyester, fluorine polymer and polyethylene on the applied surface by means of dry lamination and, after that, conducting aging treatment at 40 to 70° C. until the gel fraction reaches 40% by weight or more.

7. A layered product, prepared by laminating two or more layers of a film being composed of a polymer selected from polyester, fluorine polymer and polyethylene using the weather-resistant adhesive composition according to claim 2 as an adhesive layer, wherein the two or more layers of film may be composed of the same of different polymers.

8. A method for manufacturing a layered product, comprising the steps of applying the weather-resistant adhesive composition according to claim 2 to a film which is composed of a polymer selected from polyester, fluorine polymer and polyethylene, then layering a film which is composed of a polymer selected from polyester, fluorine polymer and polyethylene on the applied surface by means of dry lamination and, after that, conducting aging treatment at 40 to 70° C. until the gel fraction reaches 40% by weight or more.

9. A layered product, prepared by laminating two or more layers of a film being composed of a polymer selected from polyester, fluorine polymer and polyethylene using the weather-resistant adhesive composition according to claim 3 as an adhesive layer, wherein the two or more layers of film may be composed of the same of different polymers.

10. A method for manufacturing a layered product, comprising the steps of applying the weather-resistant adhesive composition according to claim 3 to a film which is composed of a polymer selected from polyester, fluorine polymer and polyethylene, then layering a film which is composed of a polymer selected from polyester, fluorine polymer and polyethylene on the applied surface by means of dry lamination and, after that, conducting aging treatment at 40 to 70° C. until the gel fraction reaches 40% by weight or more.

11. A layered product, prepared by laminating two or more layers of a film being composed of a polymer selected from polyester, fluorine polymer and polyethylene using the weather-resistant adhesive composition according to claim 4 as an adhesive layer, wherein the two or more layers of film may be composed of the same of different polymers.

12. A method for manufacturing a layered product, comprising the steps of applying the weather-resistant adhesive composition according to claim 4 to a film which is composed of a polymer selected from polyester, fluorine polymer and polyethylene, then layering a film which is composed of a polymer selected from polyester, fluorine polymer and polyethylene on the applied surface by means of dry lamination and, after that, conducting aging treatment at 40 to 70° C. until the gel fraction reaches 40% by weight or more.

\* \* \* \* \*